C. A. BROWNE.
HAND WHEEL.
APPLICATION FILED AUG. 11, 1921.

1,433,118.

Patented Oct. 24, 1922.
2 SHEETS—SHEET 1.

INVENTOR:
Charles A. Browne
By
ATTORNEYS:

Patented Oct. 24, 1922.

1,433,118

UNITED STATES PATENT OFFICE.

CHARLES A. BROWNE, OF BROCKTON, MASSACHUSETTS.

HAND WHEEL.

Application filed August 11, 1921. Serial No. 491,610.

*To all whom it may concern:*

Be it known that I, CHARLES A. BROWNE, of Brockton, in the county of Plymouth and State of Massachusetts, a citizen of the United States, have invented a new and useful Improvement in Hand Wheels, of which the following is a full, clear, and exact description, reference being had to the accompanying drawings, forming a part of this specification, in explaining its nature.

The present invention relates to a wheel presenting a hand grip and of the type commonly employed as a steering wheel.

The object of my invention is to provide a wheel having a hand grip or rim made up of a string of washers preferably of leather or other tough fibrous material, and especially to provide whereby these washers circularly arranged may be bound together and held compressed under a considerable degree of compression.

It is my further object to provide in a wheel of the above character an arrangement or means whereby its several spokes may be connected to the rim without resort to any of the fastening devices ordinarily employed; in fact, to provide whereby the spokes may be integral with certain of the component parts of the rim.

The invention can best be seen and understood by reference to the drawings, in which—

Fig. 3 is a side elevation of one of the washers later to be referred to.

Referring to the drawings:—

1 represents the hand grip or rim of the wheel and 2 its spokes.

Figure 1:
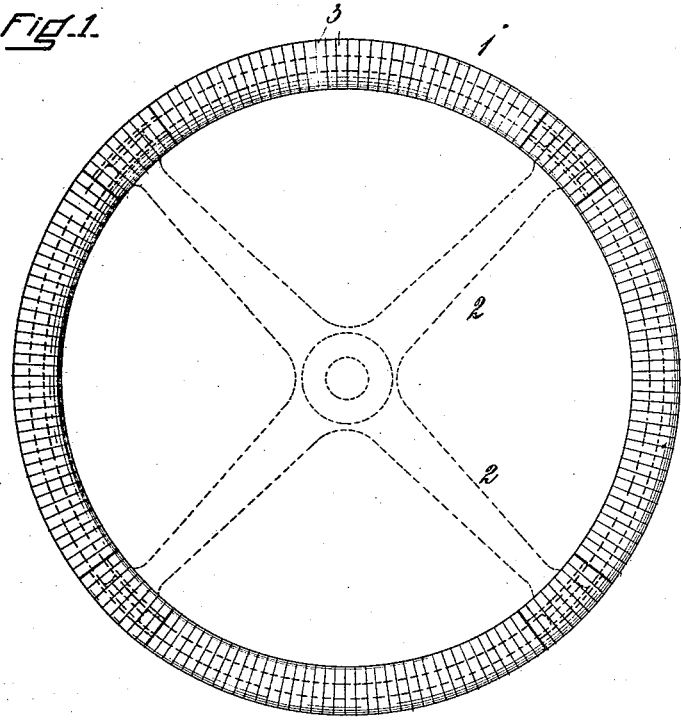
Figure 1 is a plan of the wheel.
Figure 2:
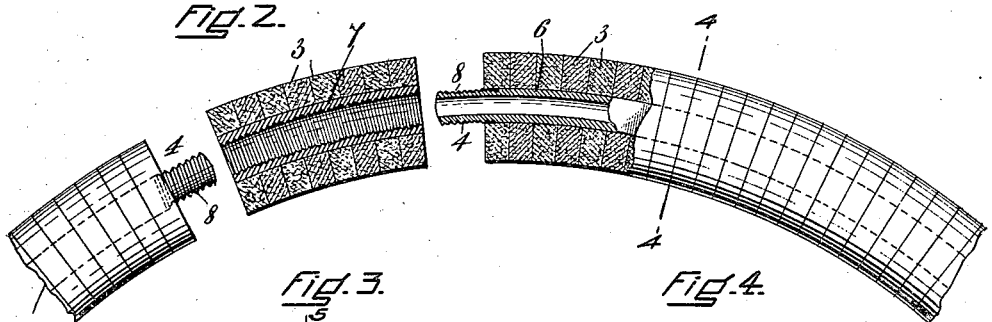
Fig. 2 is a view partly in plan and partly in section of a portion of the rim.
Figure 3:
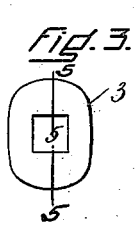
Figure 4:
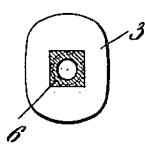
Fig. 4 is a section on line 4—4 of Fig. 2.
Figure 5:
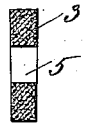
Fig. 5 is a section on line 5—5 of Fig. 3.

The rim consists of a string of washers 3 strung upon a core 4. The washers are preferably made of leather or other fibrous material; the core of metal. The general form of the washers is immaterial. In practice a slightly beveled leather washer of about ¼ of an inch in thickness is employed, generally elliptical in form as shown in Fig. 3. Through each of the washers is cut a square hole or opening through which the core extends as the washers are strung upon the core. The core in cross section corresponds to the opening through the washers which fit snugly thereon.

The core is sectional in character, there being preferably employed a number of sections 6 and 7, respectively. Of these sections the sections 6 are provided with projecting ends 8 which extend into one of the sections 7 interposed between the ends 8, the ends 8 having a right and left threaded connection with the interposed sections 7 whereby as the section 7 with the washers thereon is turned the ends 8 will be drawn toward one another and thereupon all the washers on the combined sections will become compressed.

Figure 6:
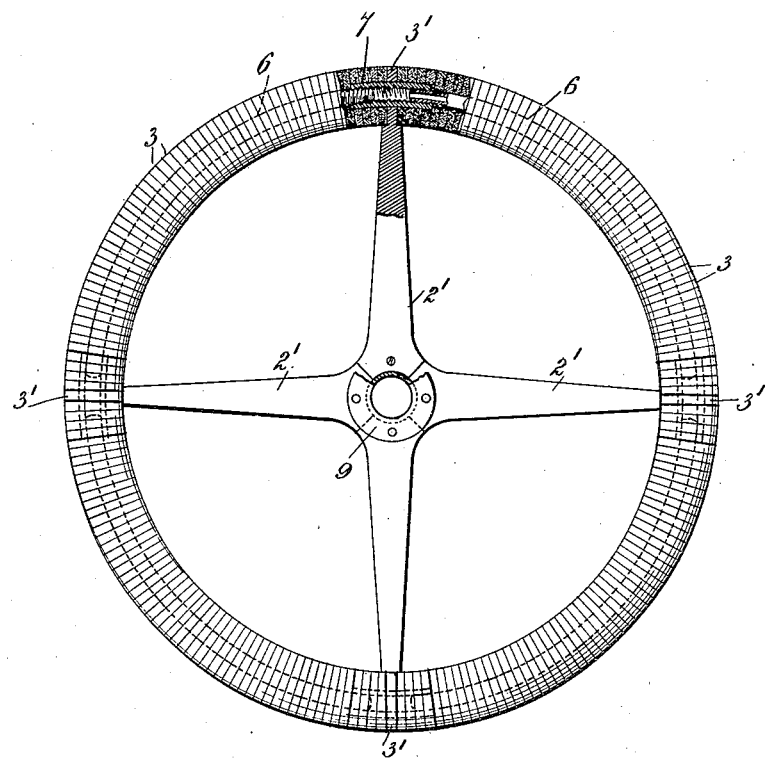
Fig. 6 is a plan of the wheel in which the spokes are integrally connected to certain parts of the rim.
Figure 7:
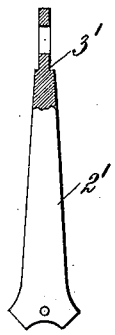
Fig. 7 shows one of the spokes partly in plan and partly in section.
Figure 8:
Fig. 8 is a side elevation of the end portion to one of the spokes.

The spokes 2 of metal, according to the construction just described, may be secured to the rim by any suitable fastening (not shown). In Fig. 6 a further embodiment of the invention is shown in that the several metal spokes 2′ of the wheel integrally connect with the rim. Such integral connection is obtained by providing each one of the spokes with a washer 3′ integral therewith which preferably is made one of the washers fitting upon one of the interposed sections 7 of the rim, such number of interposed sections being employed as will correspond with the number of spokes. When the washers are compressed by turning the interposed sections the washers 3′ on the spokes will thereby become tightly bound on the rim and the spokes thereby firmly secured to the rim.

In order that the interposed sections 7 with spokes attached thereto may be turned it is necessary that such turning be effected before the spokes are united at the centre of the wheel, each spoke then becoming a lever by which the interposed section with which it connects may be turned. After the washers have become compressed on the rim the inner ends of the several spokes are brought together at the centre of the wheel and there secured by riveting thereto a ring or other securing member 9.

Having thus fully described my invention, I claim and desire to secure by Letters Patent of the United States:—

1. A hand wheel having a rim comprising a string of washers and a core on which said washers are strung, said core having self-contained means by which the washers may be compressed along the same.

2. A hand wheel with a rim having a core and strung thereon a series of washers, said core comprising in part a turnbuckle by which the washers may be compressed along it.

3. A hand wheel with a rim having a core and strung thereon a string of washers, said core presenting in part opposing spaced ends and a rotatable core section interposed between said ends and having right and left threaded connection therewith whereby the washers may be compressed along said core by rotation of said interposed section.

4. A hand wheel with a rim having a sectional core and strung thereon a string of washers, a certain section of said core with washers strung thereon presenting spaced ends, and a rotatable core section with washers strung thereon and rotatable therewith interposed between said ends and having right and left threaded connection therewith whereby the washers on said several sections may be compressed by rotation of said interposed section.

5. A hand wheel comprising a rim having a core and strung thereon a string of washers, and spokes integrally connected to certain of said washers.

6. A hand wheel having a rim comprising a string of washers and a core on which said washers are strung, said core having self-contained means by which the washers may be compressed along the same, and spokes integrally connected to certain of said washers.

7. A hand wheel with a rim having a core and strung thereon a series of washers, said core comprising in part a number of turnbuckles by which the washers may be compressed along said core, and spokes integrally connected to certain of the washers on said several turnbuckles.

8. A hand wheel with a rim having a sectional core and strung thereon a string of washers, certain sections of said core with washers thereon presenting projecting spaced ends and rotatable core sections with washers thereon and rotatable therewith interposed between said ends and having right and left threaded connection therewith, and spokes having integral connection with certain of the washers carried by said interposed sections.

CHARLES A. BROWNE.